(12) United States Patent
Abel

(10) Patent No.: US 6,603,230 B1
(45) Date of Patent: Aug. 5, 2003

(54) ACTIVE MAGNETIC BEARING ASSEMBLY USING PERMANENT MAGNET BIASED HOMOPOLAR AND RELUCTANCE CENTERING EFFECTS

(75) Inventor: Stephen G. Abel, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/060,640

(22) Filed: Jan. 30, 2002

(51) Int. Cl.[7] .................................................. H02K 7/09
(52) U.S. Cl. ........................................ 310/90.5; 310/74
(58) Field of Search .................................. 310/90.5, 74

(56) References Cited

U.S. PATENT DOCUMENTS

| | | |
|---|---|---|
| 4,483,570 A | 11/1984 | Inoue |
| 5,084,643 A | 1/1992 | Chen |
| 5,351,934 A | 10/1994 | Jensen et al. |
| 5,666,014 A | 9/1997 | Chen |
| 5,682,071 A | 10/1997 | Buhler et al. |
| 5,729,066 A | 3/1998 | Soong et al. |
| 5,818,137 A | 10/1998 | Nichols et al. |
| 5,844,339 A | 12/1998 | Schroeder et al. |
| 5,962,940 A | 10/1999 | Imlach |
| 6,057,681 A | 5/2000 | Kipp et al. |
| 6,130,494 A | 10/2000 | Schob |
| 6,191,513 B1 | 2/2001 | Chen et al. |
| 6,222,290 B1 | 4/2001 | Schob et al. |
| 6,249,067 B1 | 6/2001 | Schob et al. |

FOREIGN PATENT DOCUMENTS

WO WO 00/07280 2/2000

Primary Examiner—Thanh Lam
(74) Attorney, Agent, or Firm—Keith A. Newburry, Esq.

(57) ABSTRACT

An active magnetic bearing assembly includes at least two rotors and two stator assemblies each having two pole faces. The pole faces of the stator assemblies are axially offset from the pole faces of their associated rotors. Thus, axial control of a shaft that is rotationally mounted using the active magnetic bearing assembly is provided by a reluctance centering force.

28 Claims, 5 Drawing Sheets

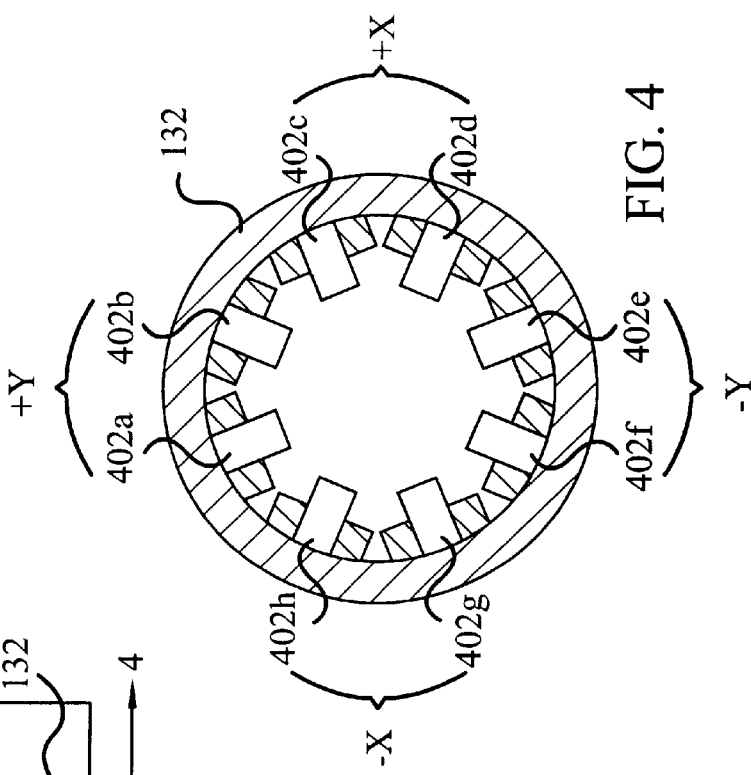
FIG. 2
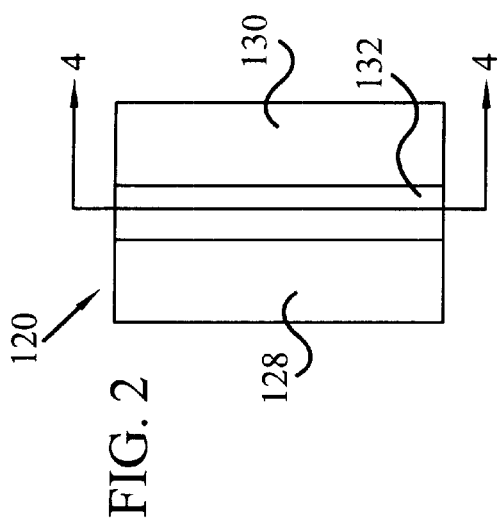
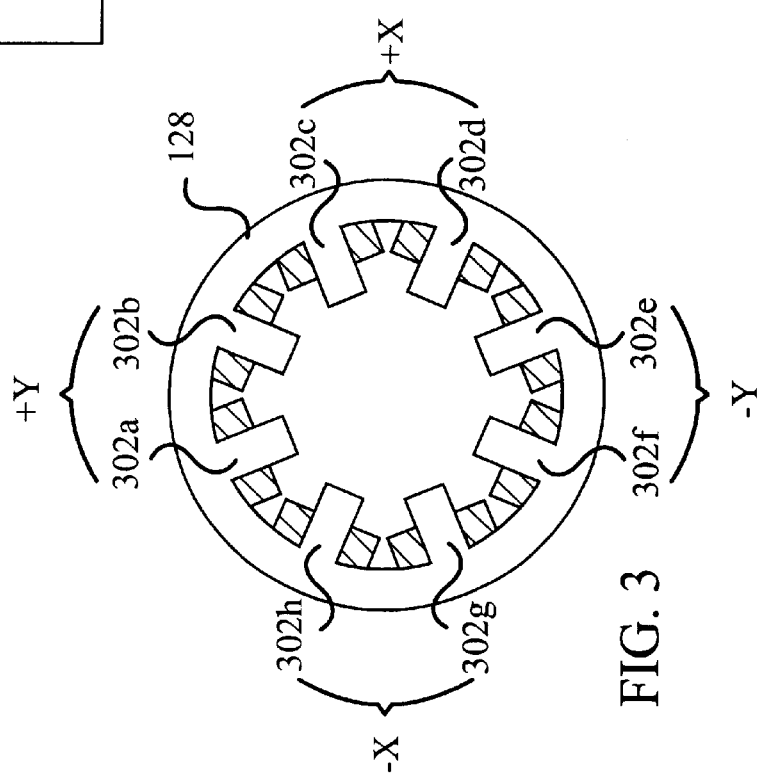
FIG. 3
FIG. 4

| DESIRED ACTION | ACTIVATE ACTUATORS | DEACTIVATE ACTUATORS |
| --- | --- | --- |
| +X | +X1, +X2 | -X1, -X2 |
| -X | -X1, -X2 | +X1, +X2 |
| +Y | +Y1, +Y2 | -Y1, -Y2 |
| -Y | -Y1, -Y2 | +Y1, +Y2 |
| +Z | +X2, -X2, +Y2, -Y2 | +X1, -X1, +Y1, -Y1 |
| -Z | +X1, -X1, +Y1, -Y1 | +X2, -X2, +Y2, -Y2 |
| +pitch | -X1, +X2 | +X1, -X2 |
| -pitch | +X1, -X2 | -X1, +X2 |
| +yaw | +Y1, -Y2 | -Y1, +Y2 |
| -yaw | -Y1, +Y2 | +Y1, -Y2 |

FIG. 5

ACTIVE MAGNETIC BEARING ASSEMBLY USING PERMANENT MAGNET BIASED HOMOPOLAR AND RELUCTANCE CENTERING EFFECTS

BACKGROUND OF THE INVENTION

The present invention relates to magnetic bearings and, more particularly, to an active magnetic bearing for use in various applications, including satellites and other space applications, that uses a reluctance centering effect to provide axial control of a rotating shaft.

Magnetic bearings suspend a rotational body, such as a rotor, with magnetic force in a non-contact fashion. That is, instead of the physically supporting the rotor using lubricated bearings that are in physical contact with the rotor, various magnets are spaced radially around the rotor and the magnetic forces supplied by the magnets suspend the rotor without any physical contact. In order to provide stable support for the rotor, the magnetic bearing suspends the rotor within five degrees-of-freedom.

Generally, there are two categories of magnetic bearings, passive magnetic bearings and active magnetic bearings. Passive magnetic bearings are the simplest type, and use permanent magnets or fixed strength electromagnets to support the rotor. Thus, the properties of the bearing, such as the magnetic field strength, may not be controlled during operation. Conversely, active magnetic bearings are configured such that the magnetic field strength of the bearing is controllable during operation. To accomplish this, at least one active magnetic bearing channel is provided for each degree-of-freedom of the shaft. An active magnetic bearing channel includes a position sensor, a controller operating according to a predetermined control law, and an electromagnetic actuator. In general, the position sensor senses the position of the shaft and supplies a signal representative of its position to the controller. The controller, in accordance with the predetermined control law, then supplies the appropriate current magnitude to the electromagnetic actuator, which in turn generates an attractive magnetic force to correct the position of the shaft.

Various active magnetic bearing assembly configurations are presently known for controlling a shaft within five degrees-of-freedom. The active magnetic bearing assembly configurations used most prominently are: (1) independent radial and axial bearings; (2) conical bearings; and (3) combination bearings. Each of these different configurations may have certain drawbacks. For example, if independent radial axial bearings are used, then the overall size, or physical package, of the system is relatively large. Conical bearings may use eight drive channels to provide control within five degrees-of-freedom, and provide space savings relative to the use of independent radial and axial bearings. However, conical bearings may suffer from temperature sensitivity, and cross-coupling of radial and axial channels. Finally, while combination bearings may also provide space savings relative to the use of independent radial and axial bearings, the assembly of this bearing configuration may be relatively complex.

Thus, there is a need for an active magnetic bearing assembly that provides the space savings and relatively simple assembly that a conical bearing provides, while simultaneously exhibiting minimal temperature sensitivity. The present invention addresses these needs.

SUMMARY OF THE INVENTION

The present invention provides an active magnetic bearing assembly that does not require the use of either separate axial bearing or a combination bearing and thus provides significant space savings and bearing commonality. The bearing also has minimal temperature sensitivity.

In one embodiment of the present invention, and by way of example only, an active magnetic bearing assembly for rotationally mounting a shaft in a non-contact manner includes a first bearing rotor, a first stator assembly, a second bearing rotor, and a second stator assembly. The first bearing rotor has at least a first pole face and a second pole face. The first stator assembly is spaced radially outwardly of the first bearing rotor and has at least a first pole face and a second pole face that are axially offset from the first bearing rotor first pole face and second pole face, respectively, by a first predetermined distance in a first direction. The second bearing rotor has at least a first pole face and a second pole face. The second stator assembly is spaced radially outwardly of the second bearing rotor and has at least a first pole face and a second pole face that are axially offset from the second bearing rotor first pole face and second pole face, respectively, by a second predetermined distance and in a second predetermined direction that is opposite the first predetermined direction.

In another embodiment of the present invention, an energy storage flywheel assembly includes a shaft, a flywheel, and an active magnetic bearing assembly. The flywheel is coupled to the shaft, and the active magnetic bearing assembly rotationally mounts the shaft in a non-contact manner. The magnetic bearing assembly includes a first bearing rotor, a first stator assembly, a second bearing rotor, and a second stator assembly. The first bearing rotor has at least a first pole face and a second pole face. The first stator assembly is spaced radially outwardly of the first bearing rotor and has at least a first pole face and a second pole face that are axially offset from the first bearing rotor first pole face and second pole face, respectively, by a first predetermined distance in a first direction. The second bearing rotor has at least a first pole face and a second pole face. The second stator assembly is spaced radially outwardly of the second bearing rotor and has at least a first pole face and a second pole face that are axially offset from the second bearing rotor first pole face and second pole face, respectively, by a second predetermined distance and in a second predetermined direction that is opposite the first predetermined direction.

In yet another embodiment of the present invention, an apparatus for imparting rotational motion to a shaft includes a shaft, a rotational motion imparting device, and an active magnetic bearing assembly. The rotational motion imparting device is coupled to the shaft, and the active magnetic bearing assembly rotationally mounts the shaft in a non-contact manner. The magnetic bearing assembly includes a first bearing rotor, a first stator assembly, a second bearing rotor, and a second stator assembly. The first bearing rotor has at least a first pole face and a second pole face. The first stator assembly is spaced radially outwardly of the first bearing rotor and has at least a first pole face and a second pole face that are axially offset from the first bearing rotor first pole face and second pole face, respectively, by a first predetermined distance in a first direction. The second bearing rotor has at least a first pole face and a second pole face. The second stator assembly is spaced radially outwardly of the second bearing rotor and has at least a first pole face and a second pole face that are axially offset from the second bearing rotor first pole face and second pole face, respectively, by a second predetermined distance and in a second predetermined direction that is opposite the first predetermined direction.

In still a further embodiment of the present invention, a satellite includes a housing, a component within the housing having a shaft, and an active magnetic bearing. The active magnetic bearing assembly rotationally mounts the shaft in a non-contact manner and includes a first bearing rotor, a first stator assembly, a second bearing rotor, and a second stator assembly. The first bearing rotor has at least a first pole face and a second pole face. The first stator assembly is spaced radially outwardly of the first bearing rotor and has at least a first pole face and a second pole face that are axially offset from the first bearing rotor first pole face and second pole face, respectively, by a first predetermined distance in a first direction. The second bearing rotor has at least a first pole face and a second pole face. The second stator assembly is spaced radially outwardly of the second bearing rotor and has at least a first pole face and a second pole face that are axially offset from the second bearing rotor first pole face and second pole face, respectively, by a second predetermined distance and in a second predetermined direction that is opposite the first predetermined direction.

Other independent features and advantages of the preferred sensor will become apparent from the following detailed description, taken in conjunction with the accompanying drawings which illustrate, by way of example, the principles of the invention.

BRIEF DESCRIPTION OF THE DRAWINGS

FIG. 2 is a side view of a particular preferred embodiment of stator assembly that is used to make the magnetic bearing assembly of the present invention;

FIG. 3 is a front view of the stator assembly depicted in FIG. 2;

FIG. 4 is a cross section view of the stator assembly depicted in FIG. 2, taken along line 4—4 in FIG. 2;

FIG. 5 is a table showing which actuators are activated and de-activated to produce a desired shaft movement;

DETAILED DESCRIPTION OF VARIOUS EMBODIMENTS

Before proceeding with the detailed description of the invention, it is to be appreciated that the magnetic bearing assembly of the present invention is not limited to use in conjunction with a specific type of device. Thus, although the present invention is, for convenience of explanation, depicted and described as being implemented in an energy storage flywheel, it will be appreciated that it can be implemented with other types of devices. For example, the magnetic bearing assembly may also be used with various other rotating devices including, but not limited to, pumps, turbines, gyroscopes, and generators.

Figure 1:
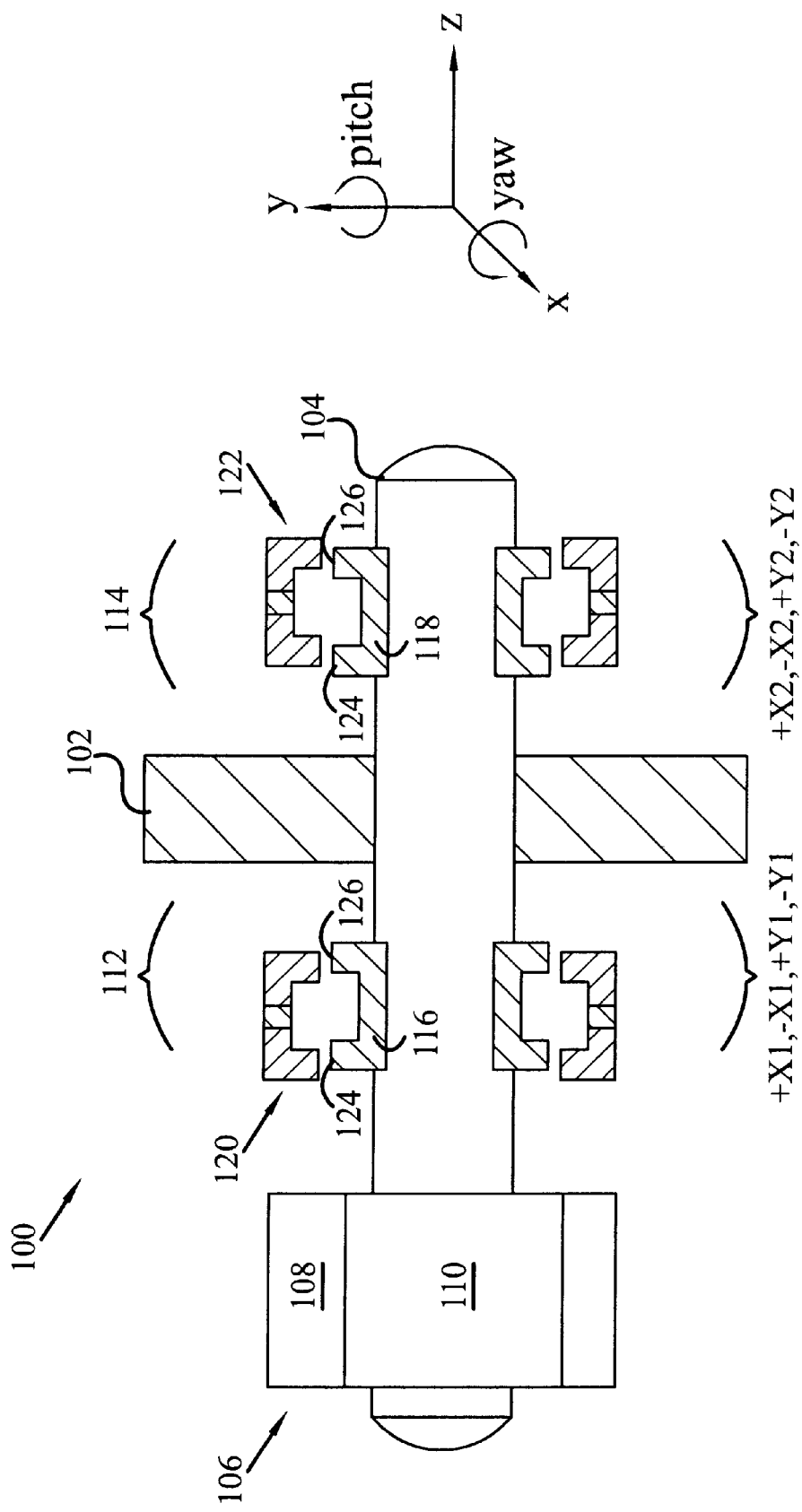
FIG. 1 is a simplified schematic side view representation of an energy storage flywheel assembly that may utilize the magnetic bearing assembly of the present invention.

A simplified schematic representation of an energy conversion device that employs the magnetic bearing assembly according to an embodiment of the present invention is depicted in FIG. 1. In the depicted embodiment, the energy conversion device is an energy storage flywheel assembly 100, which includes a flywheel 102, a rotationally mounted shaft 104, and a motor/generator 106. The energy storage flywheel assembly 100 works on the principle that the flywheel 102 spinning at very high speeds can be used to store energy. The shaft 104 couples the flywheel 102 to the motor/generator 106, which operates either as an electric motor and accelerates the flywheel 102 to store rotational kinetic energy, or as a generator that produces electrical energy from the rotational kinetic energy stored in the flywheel 102. The flywheel 102 may be comprised of any one of numerous materials, but is preferably constructed of a material having a high strength-to-density ratio, such as filament wound carbon fiber. Additionally, though not explicitly depicted, it will be appreciated that the energy storage flywheel assembly 100 may be housed within a vacuum chamber to minimize aerodynamic losses. It will be additionally appreciated that if the energy storage flywheel assembly 100 is utilized in a natural vacuum environment, such as in space applications, then the housing internals need not be a sealed vacuum.

The motor/generator 106, as its name implies and as was alluded to above, is configured to function as either a motor or a generator. The motor/generator 106 includes a motor/generator stator 108 and a motor/generator rotor 110. As noted above, when operating as a motor, electrical energy is supplied to the motor/generator stator 108 and, via normal motor action, this electrical energy is converted to mechanical energy in the motor/generator rotor 110, which rotates the shaft 104 and flywheel 102. Conversely, when it is operating as a generator, mechanical energy stored in the flywheel 102 is supplied to the shaft 104, which is in turn supplied to the motor/generator rotor 110. This mechanical energy is converted to electrical energy in the motor/generator stator 108, via normal generator action, and is supplied external to the energy storage flywheel assembly 100. It is to be appreciated that the motor/generator stator 108 and rotor 110 may be any one of numerous stator and rotor designs known in the art for performing their intended functions. An understanding of the structure of the motor/generator stator 108 and rotor 110 are not necessary to an understanding of the present invention and, therefore, will not be further described.

The shaft 104 is rotationally supported within five degrees-of-freedom. These five degrees-of-freedom, as illustrated in FIG. 1, are the three lateral axes (e.g., x, y, and z) and the two tilt axes (pitch and yaw). This rotational support of the shaft 104 is provided by two separate active magnetic bearings, one positioned on either side of the flywheel 102. In particular, with respect to the view depicted in FIG. 1, a first active magnetic bearing 112 is positioned to the left of the flywheel 102 and a second active magnetic bearing 114 is positioned to the right of the flywheel 102. As will be described more fully below, the first and second active magnetic bearings 112, 114 are preferably configured as permanent magnet biased homopolar active magnetic bearings and include, respectively, a first 116 and a second 118 rotor, and a first 120 and a second 122 stator assembly. The structure of each of these portions of the first and second active magnetic bearings 112, 114 will now be described in more detail.

Beginning first with the rotors, it can be seen that the first and second rotors 116, 118 are coupled to the shaft 104 at first and second predetermined locations, respectively, on the shaft 104. The rotors 116, 118 each have two pole faces, a first rotor pole face 124 and a second rotor pole face 126. The first and second rotors 116, 118 are constructed, in whole or in part, of a magnetically permeable material such as, preferably, a ferrous material. It is to be appreciated that the first and second rotors 116, 118 may be constructed as separate parts, or as integral parts of the shaft 104. Preferably, however, the first and second rotors 116, 118 are each constructed as separate parts, and are subsequently coupled to the shaft 104.

Turning now to the first and second stator assemblies 120, 122, reference should be made to FIGS. 2, 3 and 4, in combination with FIG. 1. It should be noted that both of the stator assemblies 120, 122 are substantially identical and, therefore, only one of the stator assemblies, specifically the first stator assembly 120, is described and depicted in FIGS. 2–4. The first and second stator assemblies 120, 122 surround a portion of, and are spaced radially outwardly from, the first and second rotors 116, 118, respectively, by a predetermined radial distance. The first and second stator assemblies 120, 122, as depicted more clearly in FIGS. 2–4, each include a first main stator body 128, a second main stator body 130, and an axial polarized permanent magnet 132. The permanent magnet 132 is positioned between the first and second main stator bodies 128, 130 and, as is generally known, functions to supply a magnetic force bias to the first and second rotors 116, 118. The permanent magnet 132 may be comprised of any one of numerous known magnetic materials including, but not limited to, samarium-cobalt, and neodymium-iron-boron. Preferably, however, it is comprised of samarium-cobalt.

The first and second stator assemblies 120, 122 also include a plurality of coil wound poles that extend radially inwardly from, and are spaced evenly around, each of the first and second main stator bodies 128, 130. Specifically, as depicted more clearly in FIGS. 3 and 4, in a preferred embodiment, the first main stator body 128 has eight coil wound poles $302a-302h$, each of which has a pole face, and the second main stator body 130 has eight corresponding coil wound poles $402a-402h$ facing radially inwardly, each having a pole face as well. Thus, the first and second stator assemblies 120, 122 each have a total of sixteen coil wound poles $302a-302h$, $402a-402h$. It is noted that although each of the stator assemblies 120, 122 in the preferred embodiment includes sixteen total coil wound poles, and thus sixteen total pole faces (e.g., eight north pole faces and eight south pole faces), it will be appreciated that the stator assemblies 120, 122 may each include other numbers of coil wound poles, and thus other numbers of pole faces. Non-limiting alternatives include using only four, or six coil wound poles. It is additionally noted that, similar to the first and second rotors 116, 118, the first and second main stator bodies 128, 130 are constructed, in whole or in part, of a magnetically permeable material such as, preferably, a ferrous material. This material may be of laminated ferrous construction, as is common practice in motor and transformer technologies, which reduces losses and enhances high-speed switching.

As was noted above, an active magnetic bearing channel includes a position sensor, a controller, and an electromagnetic actuator. In accordance with a preferred embodiment of the present invention, adjacent coil wound poles $302a-302h$, $402a-402h$ on each of the first and second stator bodies 128, 130 are series wound to create a single electromagnetic actuator. More specifically, poles $302a$ and $302b$ on first stator body 128 and poles $402a$ and $402b$ on second stator body 130 are series wound to create a +Y actuator, poles $302c$ and $302d$ on first stator body 128 and poles $402c$ and $402d$ on second stator body 130 are series wound to create a +X actuator, poles $302e$ and $302f$ on first stator body 128 and poles $402e$ and $402f$ on second stator body 130 are series wound to create a −Y actuator, and poles $302g$ and $302h$ on first stator body 128 and poles $402g$ and $402h$ on second stator body 130 are series wound to create a −X actuator. The first and the second magnetic bearings 112, 114 are similarly constructed and, therefore, each have +Y, −Y, +X, −X magnetic actuators. Thus, the actuators associated with the first magnetic bearing assembly 112 are labeled as +Y1, −Y1, +X1, −X1, and the actuators associated with the second magnetic bearing assembly 114 are labeled as +Y2, −Y2, +X2, −X2. For convenience, these labels are clearly depicted in FIG. 1 below the appropriate magnetic bearings 112, 114.

As was additionally described above, the electromagnetic actuators +Y1, −Y1, +X1, −X1, +Y2, −Y2, +X2, −X2 are each individually part of a separate active magnetic bearing channel. Thus, the first and second active magnetic bearing assemblies 112, 114 each have four channels, for a total of eight, to control the position of the shaft 104 within the five degrees-of-freedom. Shaft 104 position control within the four radial degrees-of-freedom (e.g., the two tilt axes (pitch, yaw) and two of the lateral axes (x-axis, y-axis)) is fairly straightforward. Specifically, the magnitude of the current supplied to the +Y1, −Y1, +X1, −X1, +Y2, −Y2, +X2, −X2 actuators generates magnetic flux across the radial clearance gap between the respective pole faces of the actuators and the first and second rotor pole faces 124, 126, which creates attractive radial forces on the first and second rotor pole faces 124, 126. These radial forces are translated into appropriate lateral forces and torques, which are applied to the center of gravity of the first and second rotors 116, 118, to control the shaft 104 position in these four degrees-of-freedom.

Shaft 104 position control in the remaining degree-of-freedom, meaning the axial direction (e.g., z-axis), is provided using a different physical phenomenon that does not require an additional active magnetic bearing channel. In particular, axial position control is based on the phenomenon that a force is generated along an axis that serves to reduce the reluctance of a flux path. To more fully understand how use of this phenomenon provides axial control, reference should once again be made to FIG. 1, which illustrates that the actuator pole faces are axially offset from the first and second rotor pole faces 124, 126 by a predetermined distance. In particular, the actuator pole faces of the first magnetic bearing 112 are axially offset from the first and second pole faces 124, 126 of the first rotor 116 by the predetermined distance in a first direction (e.g., the −z direction), while the actuator pole faces of the second magnetic bearing 114 are axially offset from the first and second pole faces 124, 126 of the second rotor 118 by the predetermined distance in a second direction that is opposite of the first direction (e.g., the +z direction). It will be appreciated that the actuator pole faces of the first magnetic bearing assembly 112 and the second magnetic bearing assembly 114 may also be offset from the first and second poles faces 124, 126 of their associated rotors 116, 118 by the predetermined distance in the +z and −z directions, respectively.

Since the actuator and rotor pole faces are axially offset from one another, a force is generated along the z-axis to reduce the flux path reluctance between the actuators and the rotors. Because the actuator and rotor pole faces of the first and second active magnetic bearings 112, 114 are axially offset in different directions from one another, each generates a force in the z-axis that is opposite from the other. With this arrangement, two effects serve to center the shaft along the z-axis, one passive and the other active. With the passive effect, a restoring force is generated when the shaft 104 is offset along the z-axis such that the axial offset of one rotor 116 (118) and stator 120 (122) pair is reduced, thereby reducing its reluctance centering force, while the offset of the other rotor 118 (116) and stator 122 (120) pair is increased, thereby increasing its reluctance centering force. The net effect is a force pulling the shaft 104 back to its center. It is noted that once the axial offset of a rotor 116 (118) and stator 120 (122) pair is eliminated, then the reluctance is maximized, and the centering force vanishes.

The second, active effect, is brought about by increasing the current level to all of the actuators in one magnetic bearing assembly 112 (114) and decreasing it to all the actuators in the other magnetic bearing assembly 114 (112). This causes a general increase of axial force in one of the magnetic bearing assemblies 112 (114) and a decrease of axial force in the other 114 (112). The net effect is a current controlled axial force.

To more clearly illustrate the position control that is implemented by the first and second active magnetic bearings 112, 114, FIG. 5 depicts a table that indicates which actuators should be activated and deactivated in order to provide the desired action. It is noted that the table is for a shaft 104 that exhibits no gyroscopic effects while rotating. If gyroscopic effects are present, then the skilled artisan will appreciate that the desired action for pitch and yaw control should be advanced 90-degrees, relative to the spin direction of the shaft 104.

Figure 6:
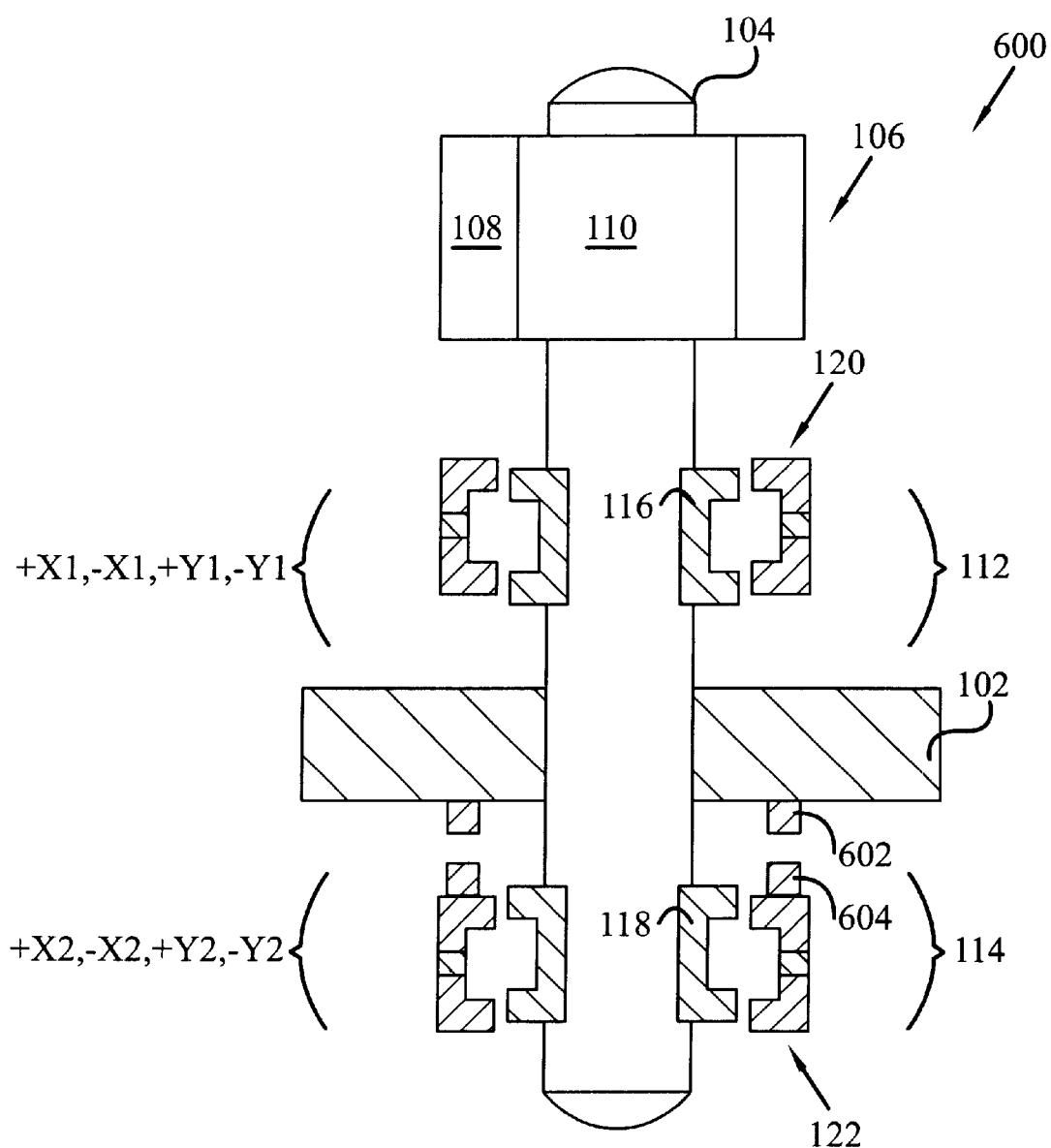
FIG. 6 is a simplified schematic side view representation of an energy storage flywheel assembly in a vertical orientation that may utilize another embodiment of the magnetic bearing assembly of the present invention.

Up to this point, the invention has been described as being implemented in a configuration in which the shaft's axial axis (or z-axis) is generally horizontal. However, it is to be appreciated that the present invention may also be implemented in a configuration in which the shaft's axial axis is generally vertical. Such an implementation is depicted in FIG. 6, which once again depicts a simplified schematic representation of an energy storage flywheel assembly 600. In this instance, however, the flywheel assembly 600 is configured such that the shaft 104 is oriented in a vertical configuration. It will be appreciated that the flywheel assembly 600 depicted in FIG. 6 is substantially identical to the one depicted in FIG. 1 and, therefore, like reference numerals refer to like parts of the two embodiments. The only difference between the embodiment of FIGS. 1 and 6 is the addition of a pair of permanent magnets that provide an axial weight offsetting function. Specifically, a first axial weight offset magnet 602 is positioned below, and preferably attached to, the flywheel 102, and a second axial weight offset magnet 604 is positioned above, and preferably attached to, the second active magnetic bearing assembly 114. The first and second axial weight offset magnets 602, 604 are oriented to repel one another to thereby create a force that offsets the weight of the flywheel 102. The first and second active magnetic bearings 112, 114 control the position of the shaft 104 in identical fashion to the embodiment described above and depicted in FIGS. 1–5. It will be appreciated that the axial weight offset magnets 602, 604 may also be included in a generally horizontal configuration, such as the one depicted in FIG. 1, without adversely affecting its operation.

Figure 7:
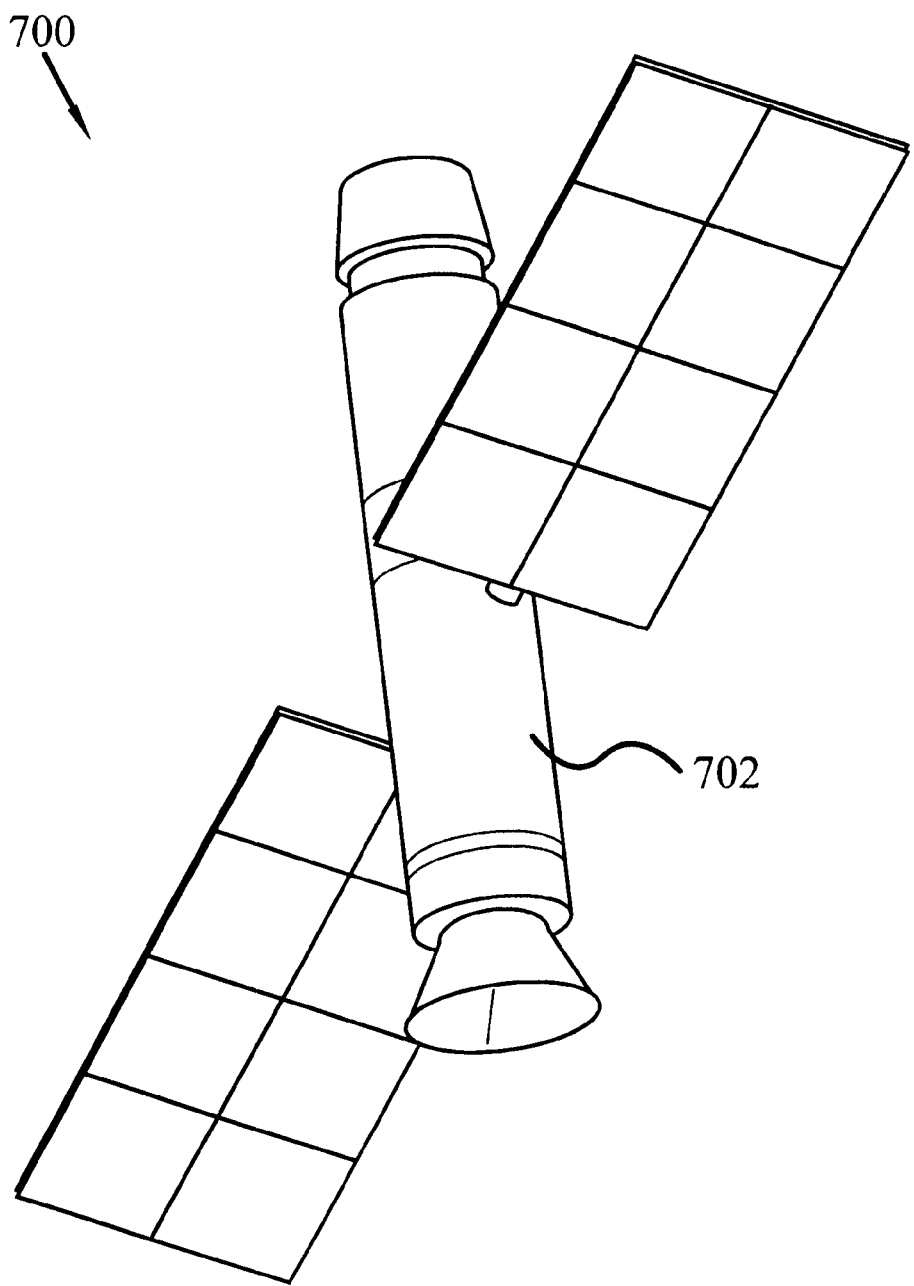
FIG. 7 is a perspective view of a satellite that incorporates, and/or includes one or more components that incorporate, the system depicted in FIG. 1.

It will be further appreciated that one of the end uses for the active magnetic bearings described herein is in space applications, such as the satellite 700 depicted in FIG. 7. The satellite 700 includes a housing 702 that incorporates, and/or houses components that include, one or more of the previously described active magnetic bearings.

The active magnetic bearing assembly of the present invention provides significant advantages over presently known magnetic bearing configurations. For example, it does not require the use of either a separate axial bearing or a combination bearing and thus provides significant space savings. The bearing also has minimal temperature sensitivity, and is less complex to assemble.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An active magnetic bearing assembly for rotationally mounting a shaft in a non-contact manner, the bearing assembly comprising:
   a first bearing rotor having at least a first pole and a second pole face;
   a first stator assembly spaced radially outwardly of the first bearing rotor and having at least a first pole face and a second pole face that are axially offset from the first bearing rotor first pole face and second pole face, respectively, by a first predetermined distance in a first direction;
   a second bearing rotor having at least a first pole face and a second pole face; and
   a second stator assembly spaced radially outwardly of the second bearing rotor and having at least a first pole face and a second pole face that are axially offset from the second bearing rotor first pole face and second pole face, respectively, by a second predetermined distance in a second direction that is opposite the first direction,
   wherein the first and second stator assemblies each comprise:
      a first stator body including at least one coil wound pole having the first pole face,
      a second stator body including at least one coil wound pole having the second pole face, and
      an axially polarized permanent magnet disposed between, and coupling together, the first and the second stator bodies.

2. The magnetic bearing assembly of claim 1, wherein:
   the first bearing rotor is coupled to the shaft at a first predetermined position on the shaft; and
   the second bearing rotor is coupled to the shaft at a second predetermined position on the shaft.

3. The magnetic bearing assembly of claim 1, wherein the axially polarized permanent magnet in each bearing stator assembly supplies a permanent magnet force bias to its associated bearing rotor.

4. The magnetic bearing assembly of claim 1, wherein the first and second stator bodies each include eight substantially evenly spaced coil wound poles.

5. The magnetic bearing assembly of claim 4, wherein selected adjacent coil wound poles on each of the first stator bodies are wound together with selected adjacent coil wound poles on their respective second stator bodies to form a single electromagnetic actuator.

6. The magnetic bearing assembly of claim 5, wherein the total number of electromagnetic actuators is four per stator assembly.

7. The magnetic bearing assembly of claim 1, wherein the first bearing rotor and first bearing stator, and the second bearing rotor and second bearing stator are each configured as homopolar magnetic bearings.

8. The magnetic bearing assembly of claim 1, further comprising:
   a first axially polarized permanent magnet coupled to one of the first and second stator assemblies; and
   a second axially polarized permanent magnet coupled to the shaft proximate the first axially polarized permanent magnet,
   wherein the first and second axially polarized permanent magnets are oriented to repel one another.

9. An energy storage flywheel assembly, comprising:
   a shaft;
   a flywheel coupled to the shaft; and
   an active magnetic bearing assembly for rotationally mounting the shaft in non-contact manner, the magnetic bearing assembly comprising:
      a first bearing rotor having at least a first pole face and a second pole face;
      a first stator assembly spaced radially outwardly of the first bearing rotor and having at least a first pole face and a second pole face that are axially offset from the first bearing rotor first pole face and second pole face, respectively, by a first predetermined distance in a first direction;
      a second bearing rotor having at least a first pole face and a second pole face; and
      a second stator assembly spaced radially outwardly of the second bearing rotor and having at least a first pole face and a second pole face that are axially offset from the second bearing rotor first pole face and second pole face, respectively, by a second predetermined distance in a second direction that is opposite the first direction,
      wherein the first and second stator assemblies each comprise:
         a first stator body including at least one coil wound pole having the first pole face,
         a second stator body including at least one coil wound pole having the second pole face, and
         an axially polarized permanent magnet disposed between, and coupling together, the first and the second stator bodies.

10. The energy storage flywheel of claim 9, wherein:
    the first bearing rotor is coupled to the shaft at a first predetermined position on the shaft; and
    the second bearing rotor is coupled to the shaft at a second predetermined position on the shaft.

11. The energy storage flywheel of claim 9, wherein the axially polarized permanent magnet in each bearing stator assembly supplies a permanent magnet force bias to its associated bearing rotor.

12. The energy storage flywheel of claim 9, wherein the first and second stator bodies each include eight substantially evenly spaced coil wound poles.

13. The energy storage flywheel of claim 12, wherein selected adjacent coil wound poles on each of the first stator bodies are wound together with selected adjacent coil wound poles on their respective second stator bodies to form a single electromagnetic actuator.

14. The energy storage flywheel of claim 13, wherein the total number of electromagnetic actuators is four per stator assembly.

15. The energy storage flywheel of claim 9, wherein the first bearing rotor and first bearing stator, and the second bearing rotor and second bearing stator are each configured as homopolar magnetic bearings.

16. The energy storage flywheel of claim 9, further comprising:
    a motor/generator operably coupled to the shaft.

17. The energy storage flywheel of claim 9, further comprising:
    a first axially polarized permanent magnet coupled to one of the first and second stator assemblies; and
    a second axially polarized permanent magnet coupled to one of the first and second sides of the flywheel, proximate the first axially polarized permanent magnet,
    wherein the first and second axially polarized permanent magnets are oriented to repel one another.

18. An apparatus for imparting motion to a shaft, comprising:
    a shaft;
    a rotational motion imparting device coupled to the shaft; and
    an active magnetic bearing assembly for rotationally mounting the shaft in non-contact manner, the magnetic bearing assembly comprising:
       a first bearing rotor having at least a first pole face and a second pole face;
       a first stator assembly spaced radially outwardly of the first bearing rotor and having at least a first pole face and a second pole face that are axially offset from the first bearing rotor first pole face and second pole face, respectively, by a first predetermined distance in a first direction;
       a second bearing rotor having at least a first pole face and a second pole face; and
       a second stator assembly spaced radially outwardly of the second bearing rotor and having at least a first pole face and a second pole face that are axially offset from the second bearing rotor first pole face and second pole face, respectively, by a second predetermined distance in a second direction that is opposite the first direction,
       wherein the first and second stator assemblies each comprise:
          a first stator body including at least one coil wound pole having the first pole face,
          a second stator body including at least one coil wound pole having the second pole face, and
          an axially polarized permanent magnet disposed between, and
       coupling together, the first and the second stator bodies.

19. The apparatus of claim 18, wherein:
    the first bearing rotor is coupled to the shaft at a first predetermined position on the shaft; and
    the second bearing rotor is coupled to the shaft at a second predetermined position on the shaft.

20. The apparatus of claim 18, wherein the axially polarized permanent magnet in each bearing stator assembly supplies a permanent magnet force bias to its associated bearing rotor.

21. The apparatus of claim 18, wherein the first and second stator bodies each include eight substantially evenly spaced coil wound poles.

22. The apparatus of claim 21, wherein selected adjacent coil wound poles on each of the first stator bodies are wound together with selected adjacent coil wound poles on their respective second stator bodies to form a single electromagnetic actuator.

23. The apparatus of claim 22, wherein the total number of electromagnetic actuators is four per stator assembly.

24. The apparatus of claim 18, wherein the first bearing rotor and first bearing stator, and the second bearing rotor and second bearing stator are each configured as homopolar magnetic bearings.

25. The apparatus of claim 18, wherein the rotational force imparting device comprises a motor.

26. The apparatus of claim 18, wherein the rotational force imparting device comprises a turbine wheel.

27. The magnetic bearing assembly of claim 18, further comprising:
   a first axially polarized permanent magnet coupled to one of the first and second stator assemblies; and
   a second axially polarized permanent magnet coupled to the shaft proximate the first axially polarized permanent magnet,
   wherein the first and second axially polarized permanent magnets are oriented to repel one another.

28. A satellite, comprising:
   a housing;
   at least one component having a shaft, the component positioned within the housing; and
   an active magnetic bearing assembly for rotationally mounting the shaft in a non-contact manner, the bearing assembly comprising:
      a first bearing rotor having at least a first pole face and a second pole face;
      a first stator assembly spaced radially outwardly of the first bearing rotor and having at least a first pole face and a second pole face that are axially offset from the first bearing rotor first pole face and second pole face, respectively, by a first predetermined distance in a first direction;
      a second bearing rotor having at least a first pole face and a second pole face; and
      a second stator assembly spaced radially outwardly of the second bearing rotor and having at least a first pole face and a second pole face that are axially offset from the second bearing rotor first pole face and second pole face, respectively, by a second predetermined distance in a second direction that is opposite the first direction,
      wherein the first and second stator assemblies each comprise:
         a first stator body including at least one coil wound pole having the first pole face,
         a second stator body including at least one coil wound pole having the second pole face, and
         an axially polarized permanent magnet disposed between, and coupling together, the first and the second stator bodies.

* * * * *